(12) United States Patent
Regev

(10) Patent No.: US 11,256,985 B2
(45) Date of Patent: Feb. 22, 2022

(54) SYSTEM AND METHOD FOR GENERATING TRAINING SETS FOR NEURAL NETWORKS

(71) Applicant: Sisense Ltd., Ramat Gan (IL)

(72) Inventor: Nir Regev, Beit Guvrin (IL)

(73) Assignee: Sisense Ltd., Ramat Gan (IL)

( * ) Notice: Subject to any disclaimer, the term of this patent is extended or adjusted under 35 U.S.C. 154(b) by 72 days.

(21) Appl. No.: 16/717,251

(22) Filed: Dec. 17, 2019

(65) Prior Publication Data

US 2020/0125950 A1 Apr. 23, 2020

Related U.S. Application Data

(63) Continuation-in-part of application No. 15/858,967, filed on Dec. 29, 2017, now Pat. No. 10,642,835.

(60) Provisional application No. 62/287,513, filed on Apr. 1, 2019, provisional application No. 62/545,053, filed on Aug. 14, 2017, provisional application No. 62/545,050, filed on Aug. 14, 2017, provisional application No. 62/545,058, filed on Aug. 14, 2017, provisional application No. 62/545,046, filed on Aug. 14, 2017.

(51) Int. Cl.
*G06F 7/00* (2006.01)
*G06N 3/08* (2006.01)
*G06F 16/2455* (2019.01)
*G06F 16/242* (2019.01)

(52) U.S. Cl.
CPC ............. *G06N 3/08* (2013.01); *G06F 16/244* (2019.01); *G06F 16/24558* (2019.01)

(58) Field of Classification Search
CPC .... G06N 3/08; G06F 16/24558; G06F 16/244

USPC ......................................... 707/600–899, 765
See application file for complete search history.

(56) References Cited

U.S. PATENT DOCUMENTS

| | | | |
|---|---|---|---|
| 5,111,531 A | 5/1992 | Grayson et al. |
| 5,515,477 A | 5/1996 | Sutherland |
| 6,108,648 A | 8/2000 | Lakshmi et al. |
| 7,181,438 B1 | 2/2007 | Szabo |
| 9,514,389 B1 | 12/2016 | Erhan et al. |

(Continued)

FOREIGN PATENT DOCUMENTS

| | | |
|---|---|---|
| CN | 106547828 A | 3/2017 |
| WO | 2017176356 A2 | 10/2017 |
| WO | 2018200979 A1 | 11/2018 |

OTHER PUBLICATIONS

The International Search Report and The Written Opinion of the International Searching Authority for PCT/US2017/069071, dated Apr. 26, 2018, ISA/RU, Moscow, Russia.

(Continued)

*Primary Examiner* — Isaac M Woo
(74) *Attorney, Agent, or Firm* — M&B IP Analysts, LLC

(57) ABSTRACT

A system and method for generating training sets for training neural networks. The method includes determining a segmentation based on a column from a columnar database table; generating a group-by query based on the segmentation; generating a plurality of reduced queries based on the group-by query; executing the group-by query on a table of a database to obtain a result table, wherein the result table includes a plurality of results, wherein each result corresponds to a respective reduced query of the plurality of reduced queries; and generating a plurality of training query pairs by pairing each reduced query with its corresponding reduced result.

19 Claims, 10 Drawing Sheets

(56) References Cited

U.S. PATENT DOCUMENTS

| | | |
|---|---|---|
| 10,311,372 B1 | 6/2019 | Hotchkies et al. |
| 10,635,680 B2 | 4/2020 | Jiang et al. |
| 10,706,354 B2 | 7/2020 | Corvinelli et al. |
| 10,713,594 B2 | 7/2020 | Szeto et al. |
| 10,878,334 B2 | 12/2020 | Lindner |
| 10,929,751 B2 | 2/2021 | Ehrman et al. |
| 10,977,581 B2 | 4/2021 | Maor et al. |
| 11,115,463 B2 | 9/2021 | Cudworth et al. |
| 2004/0093315 A1 | 5/2004 | Carney |
| 2007/0168329 A1 | 7/2007 | Haft et al. |
| 2013/0117257 A1 | 5/2013 | Meijer et al. |
| 2014/0156633 A1* | 6/2014 | Duan ............ G06F 16/2453 707/713 |
| 2014/0344203 A1 | 11/2014 | Ahn |
| 2015/0100955 A1 | 4/2015 | Chen et al. |
| 2015/0278709 A1 | 10/2015 | Zeng et al. |
| 2016/0162781 A1 | 6/2016 | Lillicrap et al. |
| 2017/0109355 A1 | 4/2017 | Li et al. |
| 2017/0357896 A1 | 12/2017 | Tsatsin et al. |
| 2018/0082183 A1 | 3/2018 | Hertz et al. |
| 2018/0157758 A1 | 6/2018 | Arrizabalaga et al. |
| 2018/0268015 A1 | 9/2018 | Sugaberry |
| 2018/0329951 A1 | 11/2018 | Yu et al. |
| 2018/0341862 A1 | 11/2018 | Ehrman |
| 2018/0357240 A1 | 12/2018 | Miller et al. |
| 2019/0180195 A1 | 6/2019 | Terry et al. |
| 2020/0125950 A1 | 4/2020 | Regev |
| 2020/0142888 A1 | 5/2020 | Alakuijala et al. |

OTHER PUBLICATIONS

Anagnostopoulos, et al., "Efficient Scalable Accurate Regression Queries in In-DBMS Analytics", IEEE International Conference on Data Engineering (ICDE), 2017.

Doulamis, et al., "On-Line Retrainable Neural Networks: Improving the Performance of Neural Networks in Image AnalysisProblems", IEEE Transactions on Neural Networks, vol. 11, No. 1, Jan. 2000 (Year: 2000).

Melucci, Massimo, "Impact of Query Sample Selection Bias on Information Retrieval System Ranking" IEEE International Conference on Data Science and Advanced Analytics (DSAA), Oct. 17-19, 2016.

Yang, et al., "A Variance Maximization Criterion for Active Learning", Pattern Recognition Library, Jun. 23, 2017.

Yuan, et al., "Optimizing Batch Linear Queries under Exact and Approximate Differential Privacy," ACM Transactions on Database Systems, vol. 40, No. 2, Article 11, Jun. 2015.

Yegulalp, Serdar, "Machine learning comes to your browser via JavaScript", InfoWorld, Aug. 2, 2017.

Wang et al., "Relevance Feedback Technique for Content-Based Image Retrieval Using Neural Network Learning" Proceedings of the Fifth International Conference on Machine Learning and Cybernetics, Dalian, Aug. 13-16, 2006.

Brownlee, Jason, "A Gentle Introduction to Statistical Data Distributions" A Stata Press Publication: StataCorp LP, Jun. 8, 2018, pp. 1-20.

First Foreign Office Action for European Application No. 17921683. 3, dated Jun. 17, 2021, European Patent Office.

Chang et al., "Active Bias: Training More Accurate Neural Networks by Emphasizing High Variance Samples", arXiv: 1704. 07433v2, May 22, 2017, pp. 1-15.

Cohen et al., "A Minimal Variance Estimator for the Cardinality of Big Data Set Intersection" arXiv: 1606.00996v1., Jun. 3, 2016.

Cohen et al., :A Minimal Variance Estimator for the Cardinality of Big Data Set Intersection, KDD 2017 Research Paper, Aug. 13-17, 2017, pp. 95-103.

Hendrycks et al., "Adjusting for Dropout Variance in Batch Normalization and Weight Initialization", arXiv: 1607.02488v2, Mar. 23, 2017, pp. 1-10.

Ivanov et al., "Adaptive Cardinality Estimation", arXiv: 1711. 08330v1, Nov. 22, 2017, pp. 1-12.

Katharopoulos et al., "Biased Importance Sampling for Deep Neural Network Training", arXiv: 1706.00043v1, Sep. 13, 2017, pp. 1-12.

Loshchilov et al., "Online Batch Selection for Faster Training of Neural Networks", arXiv: 1511 06343v4, Apr. 25, 2016, pp. 1-20.

Wang et al., "Synthesizing Highly Expressive SQL Queries from Input-Output Examples", Jun. 2017, pp. 452-466.

Xiong et al., "End-to-End Neural Ad-hoc Ranking with Kernel Pooling", arXiv:1706.06613v1, Jun. 20, 2017.

Xu et al., "SQLNet: Generating Structured Queries from Natural Language without Reinforcement Learning", arXiv 1711.0443v1, Nov. 13, 2017, pp. 1-13.

* cited by examiner

SYSTEM AND METHOD FOR GENERATING TRAINING SETS FOR NEURAL NETWORKS

CROSS-REFERENCE TO RELATED APPLICATIONS

This application claims the benefit of U.S. Provisional Patent Application No. 62/827,513 filed on Apr. 1, 2019. This application is also a continuation-in-part of U.S. patent application Ser. No. 15/858,967 filed on Dec. 29, 2017. The Ser. No. 15/858,967 application claims the benefit of:
  U.S. Provisional Application No. 62/545,046 filed on Aug. 14, 2017;
  U.S. Provisional Application No. 62/545,050 filed on Aug. 14, 2017;
  U.S. Provisional Application No. 62/545,053 filed on Aug. 14, 2017; and
  U.S. Provisional Application No. 62/545,058 filed on Aug. 14, 2017.
All of the applications referenced above are herein incorporated by reference.

TECHNICAL FIELD

The present disclosure relates generally to generating query results from databases, and particularly to generating query results to be used as training sets for a neural network.

BACKGROUND

It is becoming increasingly resource-intensive to produce useful results from the growing amount of data generated by individuals and organizations. Some businesses and organizations can generate petabytes of data daily. These businesses and organizations could therefore benefit greatly from mining such data to extract useful insights from their generated data that is automatically gathered and stored in the course of usual business operations.

An existing approach in attempting to gain insight from data includes querying a database storing the data to get a specific result. For example, a user may generate a query (e.g., an SQL query) and send the query to a database management system (DBMS) that executes the query on one or more tables stored on the database. This is a relatively simple case. However, the reality is more complex. As organizations now rely on a multitude of vendors for managing their data, each with their own technology for storing data, retrieving useful insights from this data is becoming increasingly complex. It is not uncommon for queries to take several minutes, or even hours, to complete when applied to the vast amount of stored data.

Some existing solutions attempt to accelerate access to the databases. For example, one solution includes indexing data stored in databases. Another solution includes caching results of frequent queries. Yet another solution includes selectively retrieving results from the database, so that the query would be served immediately.

However, while these database optimization and acceleration solutions are useful in analyzing databases of a certain size or known data sets, they can fall short of providing useful information when applied to large and unknown data sets, which may include data that an indexing or caching algorithm has not been programmed to process.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating training sets for training neural networks. The method comprises: determining a segmentation based on a column from a columnar database table; generating a group-by query based on the segmentation; generating a plurality of reduced queries based on the group-by query; executing the group-by query on a table of a database to obtain a result table, wherein the result table includes a plurality of results, wherein each result corresponds to a respective reduced query of the plurality of reduced queries; and generating a plurality of training query pairs by pairing each reduced query with its corresponding reduced result.

Certain embodiments disclosed herein also include a non-transitory computer readable medium having stored thereon causing a processing circuitry to execute a process, the process comprising: determining a segmentation based on a column from a columnar database table; generating a group-by query based on the segmentation; generating a plurality of reduced queries based on the group-by query; executing the group-by query on a table of a database to obtain a result table, wherein the result table includes a plurality of results, wherein each result corresponds to a respective reduced query of the plurality of reduced queries; and generating a plurality of training query pairs by pairing each reduced query with its corresponding reduced result.

Certain embodiments disclosed herein also include a system for generating training sets for training neural networks. The system comprises: a processing circuitry; and a memory, the memory containing instructions that, when executed by the processing circuitry, configure the system to: determine a segmentation based on a column from a columnar database table; generate a group-by query based on the segmentation; generate a plurality of reduced queries based on the group-by query; execute the group-by query on a table of a database to obtain a result table, wherein the result table includes a plurality of results, wherein each result corresponds to a respective reduced query of the plurality of reduced queries; and generate a plurality of training query pairs by pairing each reduced query with its corresponding reduced result.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
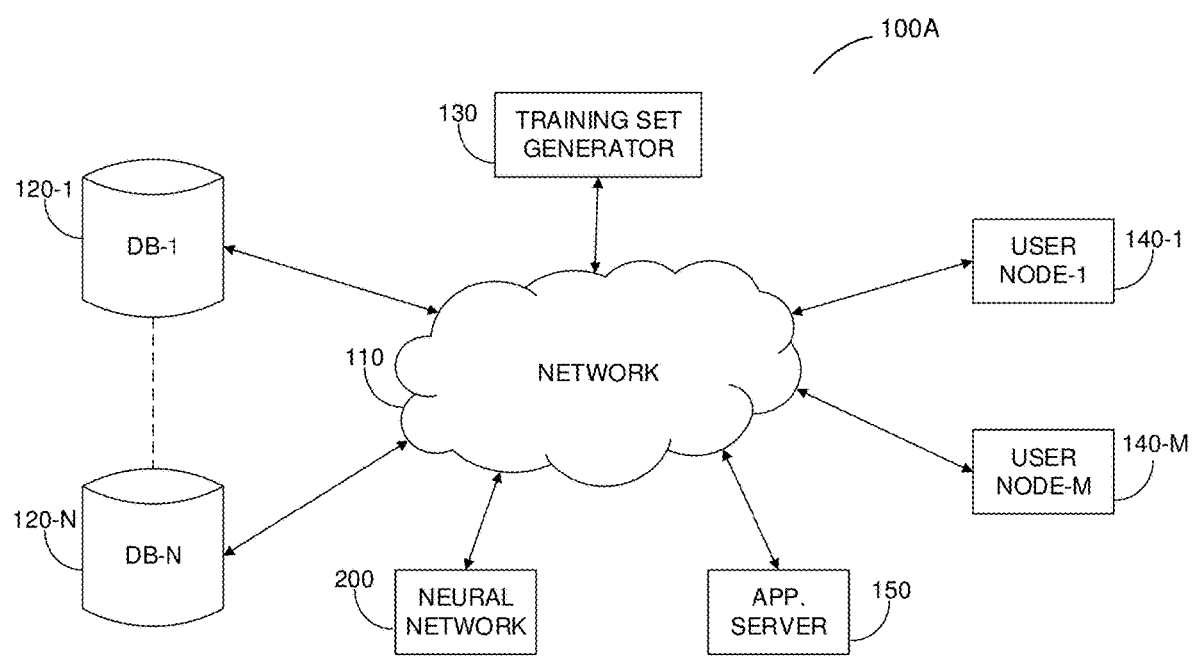
FIG. 1A shows a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1A shows a network diagram 100A utilized to describe various disclosed embodiments.

A network 110 provides connectivity to databases (DBs) 120-1 to 120-N (where N is an integer greater than or equal to 1), a training set generator 130, user nodes 140-1 to 140-M (where M is an integer greater than or equal to 1), an approximation (APP.) server 150, and a neural network 200. The network 110 may be, but is not limited to, a wireless, cellular or wired network, a local area network (LAN), a wide area network (WAN), a metro area network (MAN), the Internet, the worldwide web (WWW), similar networks, and any combination thereof.

Each of the databases 120-1 through 120-N (hereinafter referred to as a database 120 or as databases 120, merely for simplicity) may store one or more structured data sets. In some embodiments, a database 120 may be implemented as any of a distributed database, data warehouse, federated database, graph database, columnar database, and the like. A database 120 may include a database management system (DBMS, not shown) which manages access to the database 120. In certain embodiments, a database 120 may include one or more tables of data (not shown).

The neural network (NN) 200 may be implemented as a recurrent NN (RNN). In an embodiment, a plurality of NNs may be implemented. For example, a second NN may have more layers than a first NN, as described herein below. The second NN may generate predictions with a higher degree of certainty (i.e., have a higher confidence level) than the first NN, while requiring more memory to store its NN model than the first NN.

Each of the user nodes 140-1 through 140-M (hereinafter referred to as user node 140 or user nodes 140, merely for simplicity) may be, but is not limited to, a mobile device, a smartphone, a desktop computer, a laptop computer, a tablet computer, a wearable device, an Internet of Things (IoT) device, and the like. The user node 140 is configured to send a query to be executed on one or more of the databases 120. In an embodiment, a user node 120 may send the query directly to a database 120, to be handled, for example, by a DBMS of the database 120. In a further embodiment, the query is sent to an approximation server 150.

The training set generator 130 is configured to receive, for example from a DBMS of a database 120, a plurality of training queries from which to generate a training set for the neural network 200. An embodiment of the training set generator 130 is discussed in more detail below with respect to FIG. 5.

In an embodiment, the approximation server 150 is configured to receive queries from the user nodes 140 and to send the received queries to be executed on the appropriate databases 120. The approximation server 150 may also be configured to provide a user node 140 with an approximate result generated by the NN 200. Providing such approximate results is discussed in more detail below with respect to FIG. 2.

Each of the training set generator 130 and the approximation server 150 may include a processing circuitry and a memory (not shown in FIG. 1). An example system that may be configured as the training set generator 130 or the approximation server 150 is discussed in more detail below with respect to FIG. 9.

Figure 1B:
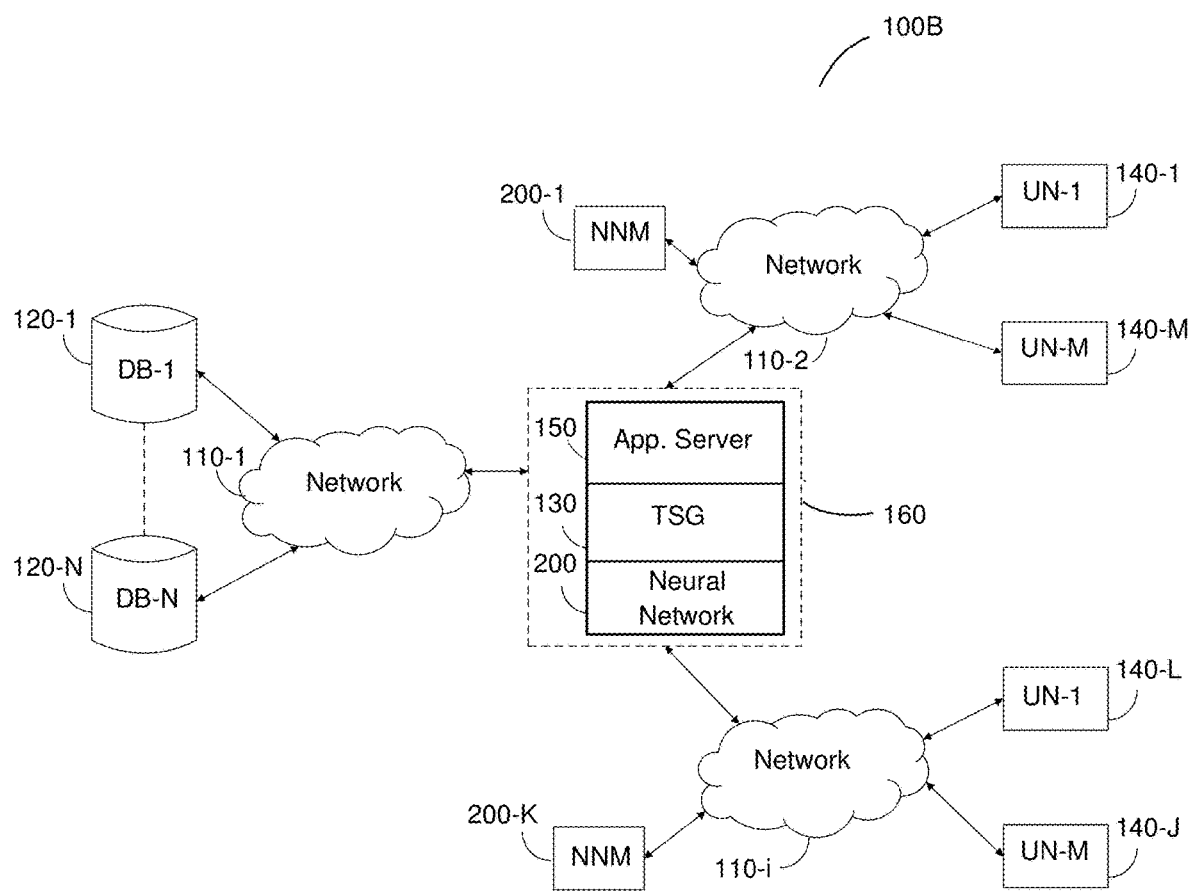
FIG. 1B shows another network diagram utilized to describe various disclosed embodiments.

FIG. 1B shows another network diagram 100B utilized to describe various disclosed embodiments. As shown in FIG. 1B, multiple networks 110-1 through 110-$i$ (where i is an integer having a value of 2 or greater) are employed for approximating the query results. A first network 110-1 is connected to databases 120. A second network 110-2 is connected to one or more user nodes (UN) 140 and a neural network machine 200-1. The first network 110-1 and the second network 110-2 are each further connected to a central link 160.

In an embodiment, the central link 160 includes an approximation server 150, a training set generator (TSG) 130, and a neural network 200. In a further embodiment, the approximation server 150 includes the training set generator 130 and the neural network 200. In other deployments, additional networks 110 are further connected to the central link 160. Specifically, each additional network 110 is connected to one or more user nodes 140-L through 140-J and a local neural network machine 200-K. In an example implementation, 'M', 'N', 'J', 'K', and 'L' are each integers greater than or equal to 1.

The second network 110-2 and each additional network 110 may include local networks, such as, but not limited to, virtual private network (VPNs), local area network (LANs), and the like. Each local network includes a respective local NN machine of NN machines 200-1 through 200-K. Each local NN machine 200 stores a NN model which is generated by the approximation server 150. In an example implementation, a NN model may be stored on one or more of the user nodes 140 connected through the same local network 110.

In an example implementation, the user node 140-1 is configured to send a query to be executed on one or more of the databases 120 either directly (not shown) or via the approximation server 150 of the central link 160. The approximation server 150 may be configured to provide the user node 140-1 with an approximate result generated by the NN 200.

In some embodiments, a first NN and a second NN are trained on a data set of one or more databases 120. For example, the first NN may include fewer layers and neurons than the second NN. The first NN may be stored in one or more local NN machines 200, such as local NN machine 200-1, and the second NN may be stored on the approximation server 150. When a user node 140-1 sends a query for execution, the first NN stored on local NN machine 200-1 may provide an initial first predicted result to the user node 140-1. The approximation server 150 will then provide a second predicted result having a greater accuracy than the first predicted result. In some embodiments, the approximation server 150 may send the query for execution on the data set from the database 120, and provide the real (i.e., not merely predicted) result to the user node 140-1.

In an embodiment, the first NN is executed on a user node 140 only if the user node has sufficient computational resources (e.g., sufficient processing power and memory) to efficiently execute the query on the second neural network. If not, then the user node may be configured to either access a local machine (e.g., a dedicated machine, or another user node on the local network) to generate predictions from a local neural network, or be directed to the approximation server 150 of the central link 160.

It should be appreciated that the arrangement discussed with reference to FIG. 1B allows for a more efficient response to a query than sending a query directly to a database 120 for a real result, as the time required to receive a result is reduced by providing an initial approximation, a more accurate second approximation, and finally a real result. It should be further appreciated that using a plurality of neural networks allows for increasingly accurate results to be obtained. It should be further noted that implementing the neural network on a local machine or even a user device allows for significant reduction of the storage required to maintain the data. For example, a typical size of neural network can be in the tens of megabytes comparable to a database (maintaining substantially the same data) having a size of hundreds of gigabytes.

Figure 2:
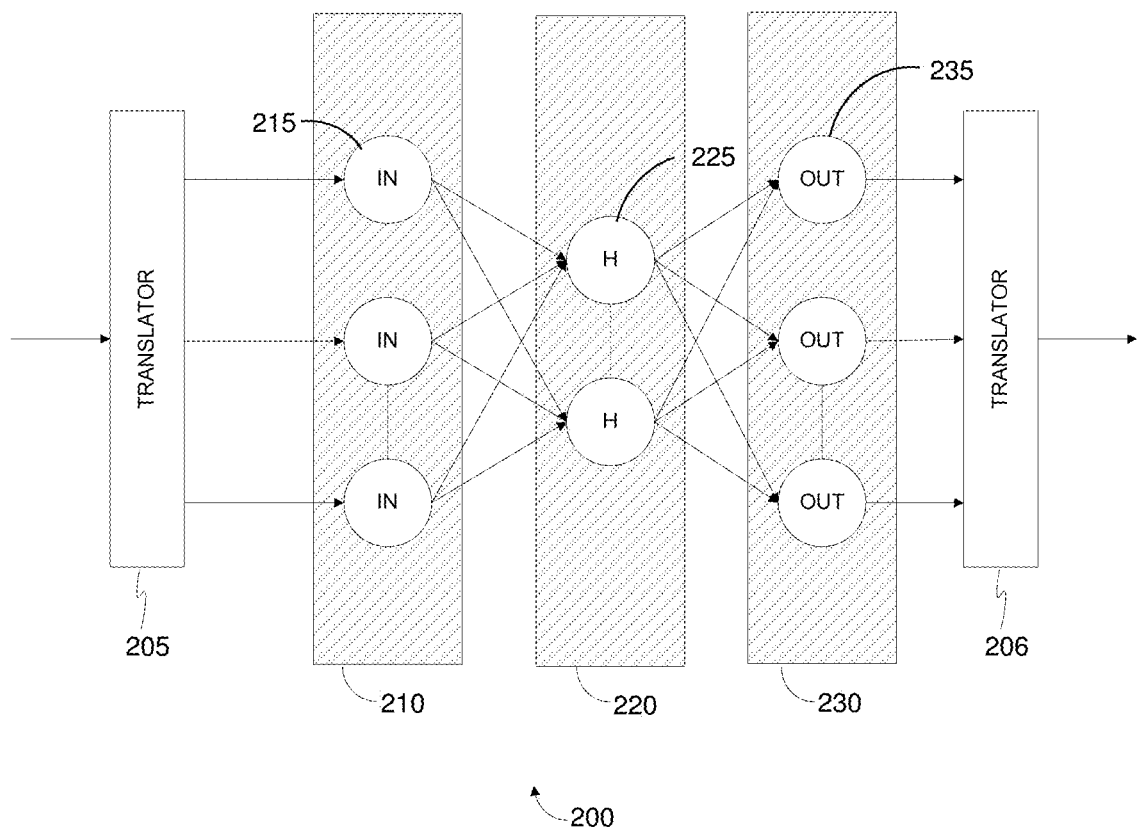
FIG. 2 is a schematic diagram of a neural network according to an embodiment.

FIG. 2 is a schematic diagram of a neural network (NN) 200 for generating approximate results for a database query according to an embodiment. The neural network 200 includes an input numerical translator matrix 205. The input numerical translator matrix 205 is configured to receive a query and translate the query to a numerical representation which can be fed into an input neuron 215 of the neural network 200.

The input numerical translator matrix 205 is configured to determine what elements, such as predicates and expressions, are present in the received query. In an embodiment, each element is mapped by an injective function to a unique numerical representation. For example, the input numerical translator matrix 205 may receive a query and generate, for each unique query, a unique vector. The unique vectors may be fed as input to one or more of input neurons 215, which together form an input layer 210 of the neural network 200.

Each neuron (also referred to as a node) of the neural network 200 is configured to apply a function to its input and to send the output of the function forward (e.g., to another neuron). Each neuron may include a weight function. A weight function of a neuron determines the amount of contribution a single neuron has on the eventual output of the neural network. The higher a weight value used by the weight function is, the greater the effect that the neuron's computation carries on the output of the neural network.

The neural network 200 further includes a plurality of hidden neurons 225 in a hidden layer 220. In this exemplary embodiment, a single hidden layer 220 is shown, however a plurality of hidden layers may be implemented without departing from the scope of the disclosed embodiments.

In an embodiment, the neural network 200 is configured such that each output of an input neuron 215 of the input layer 210 is used as an input to one or more hidden neurons 225 in the hidden layer 220. Typically, each output of the input neurons 215 is used as an input to all of the hidden neurons 225 of the hidden layer 220. In embodiments where multiple hidden layers are implemented, the output of the input layer 210 is used as the input for the hidden neurons of a first hidden layer among the multiple hidden layers.

The neural network 220 further includes an output layer 230, which includes one or more output neurons 235. The output of the hidden layer 220 is the input of the output layer 230. In an embodiment where a plurality of hidden layers is implemented, the output of the final hidden layer is used as the input to the output layer 230. In some embodiments, the output neurons 235 of the output layer 230 may provide a result to an output numerical translator matrix 206, which is configured to translate the output of the output layer 230 from a numerical representation to a query result. The result may then be sent to a user node which sent the query.

In some embodiments, the neural network 200 may be stored on one or more user nodes (e.g., the user nodes 140 of FIGS. 1A and 1B). This could allow, for example, a user of the user node to receive a response to a query faster than if the query was sent to be executed on a remote database. Additionally, the neural network 220 can be stored within a central link (e.g., the central link 160 of FIG. 1), where multiple local networks can access the neural network 200. While the result may not always be as accurate as querying the data directly for real results, using the neural network 200 allows the user of a user node to receive a faster response with an approximated result above a predetermined level of accuracy.

The neural network 200 may be trained by executing a number of training queries and comparing predicted results from the neural network 200 to real results determined from querying a database directly. The training of a neural network 200 is discussed in further detail below with respect to FIG. 5. In an embodiment, the neural network 200 may further include a version identifier, indicating the amount of training data the neural network 200 has received. For example, a higher version number may indicate that a first neural network contains a more up-to-date training than a second neural network with a lower version number. The up-to-date version of a neural network may be stored on an approximation server, e.g., the approximation server 150 of FIGS. 1A and 1B.

In an embodiment, a user node may periodically poll the approximation server to check if there is an updated version of the neural network. In another embodiment, the approximation server may push a notification to one or more user nodes to indicate that a new version on the neural network is available and downloadable over a network connection. In some embodiments, the approximation server may have stored therein multiple trained neural networks, where each neural network is trained on a different data set. While multiple neural networks may be trained on different data sets, it is understood that some overlap may occur between data sets.

It should be noted that the neural network discussed with respect to FIG. 1 can be executed over or realized by a general purpose or dedicated hardware. Examples for such hardware include analog or digital neuro-computers. Such computers may be realized using any one of a combination of electronic components, optical components a von-Neumann multiprocessor, a graphical processing unit (GPU), a vector processor, an array processor, a tensor processing unit, and the like.

Figure 3:
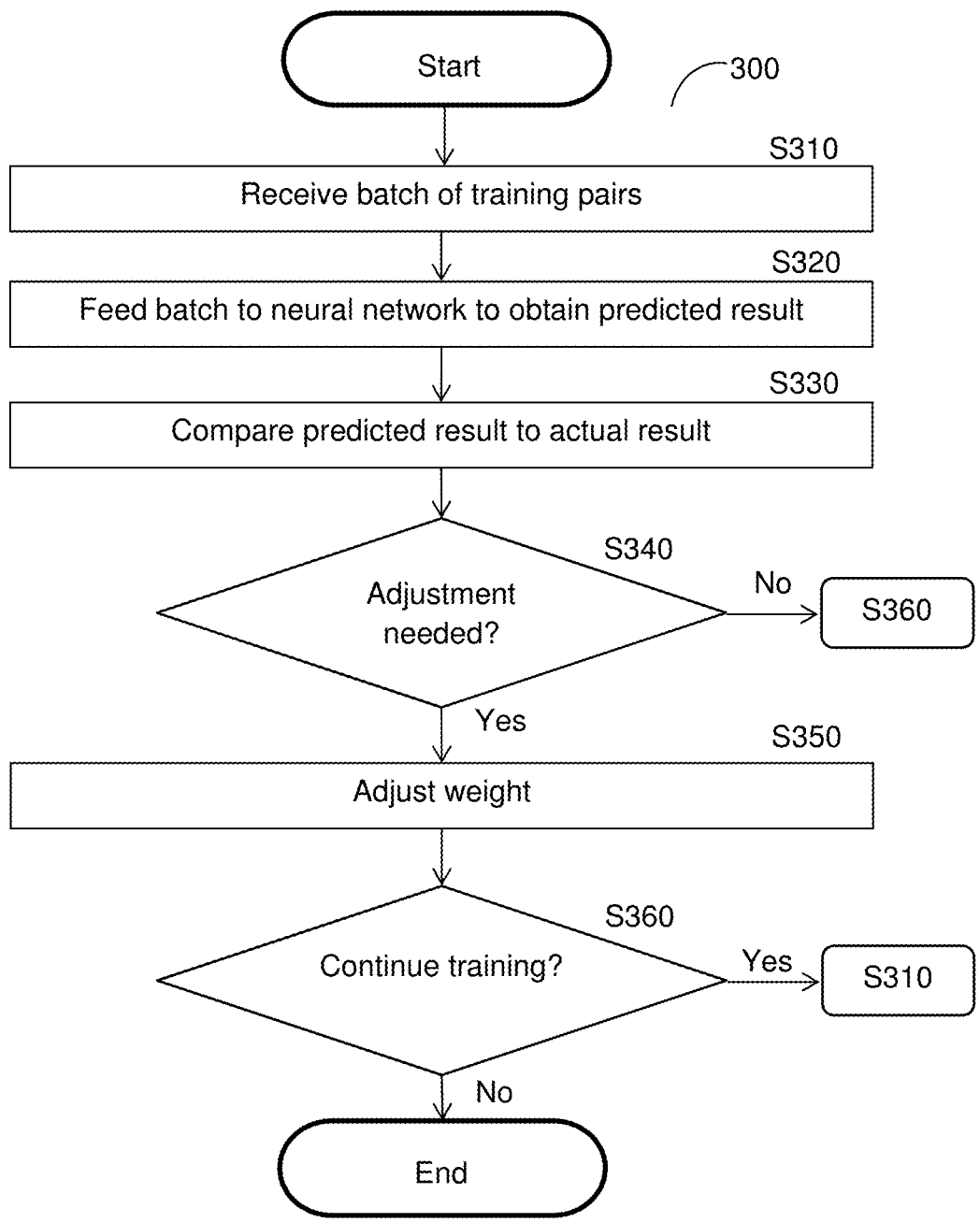
FIG. 3 is a flowchart illustrating a method for training a neural network to approximate query results according to an embodiment.

FIG. 3 is a flowchart 300 illustrating a method for training a neural network to approximate results for queries related to a data set according to an embodiment. In an embodiment, the method may be performed by the approximation server 150 of FIGS. 1A-B.

At S310, a batch of training query pairs is received. The received batch may be one batch among multiple batches, where multiple batches is referred to as an epoch.

In an embodiment, the batch of training queries is generated by a training set generator and includes multiple queries and corresponding real results. The query includes query elements such as, for example, predicates and expressions. Typically, the query pairs are vectorized to a format which the neural network is able to process, for example, by an input numerical translator matrix (e.g., as shown in FIG. 2).

At S320, the batch of training query pairs is fed to a neural network to generate a predicted result for each query. The neural network is configured to receive a batch of training queries. The queries may be fed through one or more layers within the neural network. For example, a query may be fed through an input layer, one or more hidden layers, and an output layer. In an embodiment, each query is first fed to an input numerical translator matrix to determine elements present within the query. Each element is mapped (e.g., by an injective function) to a numerical representation, such as a vector. The vectors may be fed to one or more neurons, where each neuron is configured to apply a function to the vector, where the function includes at least a weight function. In an example embodiment, the weight function determines the contribution of each neuron function toward a final query predicted result.

At S330, a comparison is made between the predicted result generated by the neural network and a real result of that query. The comparison includes determining the differences between the predicted result and the real result. For example, if the real result is a number value, the comparison includes calculating the difference between a number output value from the predicted result and the number value of the real result.

The real result corresponding to each query may be previously generated by executing the query directly on a data set. The real result of the query may be, for example, an alphanumerical string or a calculated number value. In an embodiment, a query may be related to all, or part, of a data set. For example, a query directed to a columnar database may be executed based on a subset of columns of a table which does not include all columns of the table.

At S340, a determination is made if a weight of one or more of the neurons of the neural network should be adjusted. In an example implementation, a weight adjustment is needed if the difference between the first predicted result and the first real result exceeds a threshold. For example, if the difference of number value exceeds 15%, it may be determined that a weight adjustment is needed. If it is determined that the weight should be adjusted, execution continues at S350, otherwise execution continues at S360.

At S350, the weight of a neuron is adjusted via a weight function. The weight of a neuron determines the amount of contribution a single neuron has on the eventual output of the neural network. The higher a weight value used by the weight function is, the more effect the neuron's computation carries on the output of the neural network. Adjusting weights may be performed, for example, by methods of back propagation. One example for such a method is a "backward propagation of errors," which is an algorithm for supervised learning of neural networks using gradient descent. Given an artificial neural network and an error function, the method calculates the gradient of the error function with respect to the neural network's weights.

At S360, it is determined if the training for the neural network should continue. In an embodiment, training will end if an epoch has been fully processed, i.e., if all batches have been processed via the neural network. If the epoch has not been fully processed, execution continues at S310 where a new batch is fed to the neural network; otherwise, execution terminates. In another embodiment, training will end if a threshold number of epochs has been fully processed. The system may generate a target number of epochs to train the neural network with, based on the amount of training queries generated, the variance of the data set, the size of the data set, and the like.

In an embodiment, S360 may include plotting the predicted results against the real results, determining a function, and performing a regression of that function, to determine if it is sufficiently linear. Sufficiently linear may be, for example, if the $R^2$ value of the regression is above a predetermined threshold. Such an embodiment is described further with respect to FIG. 4.

Figure 4:
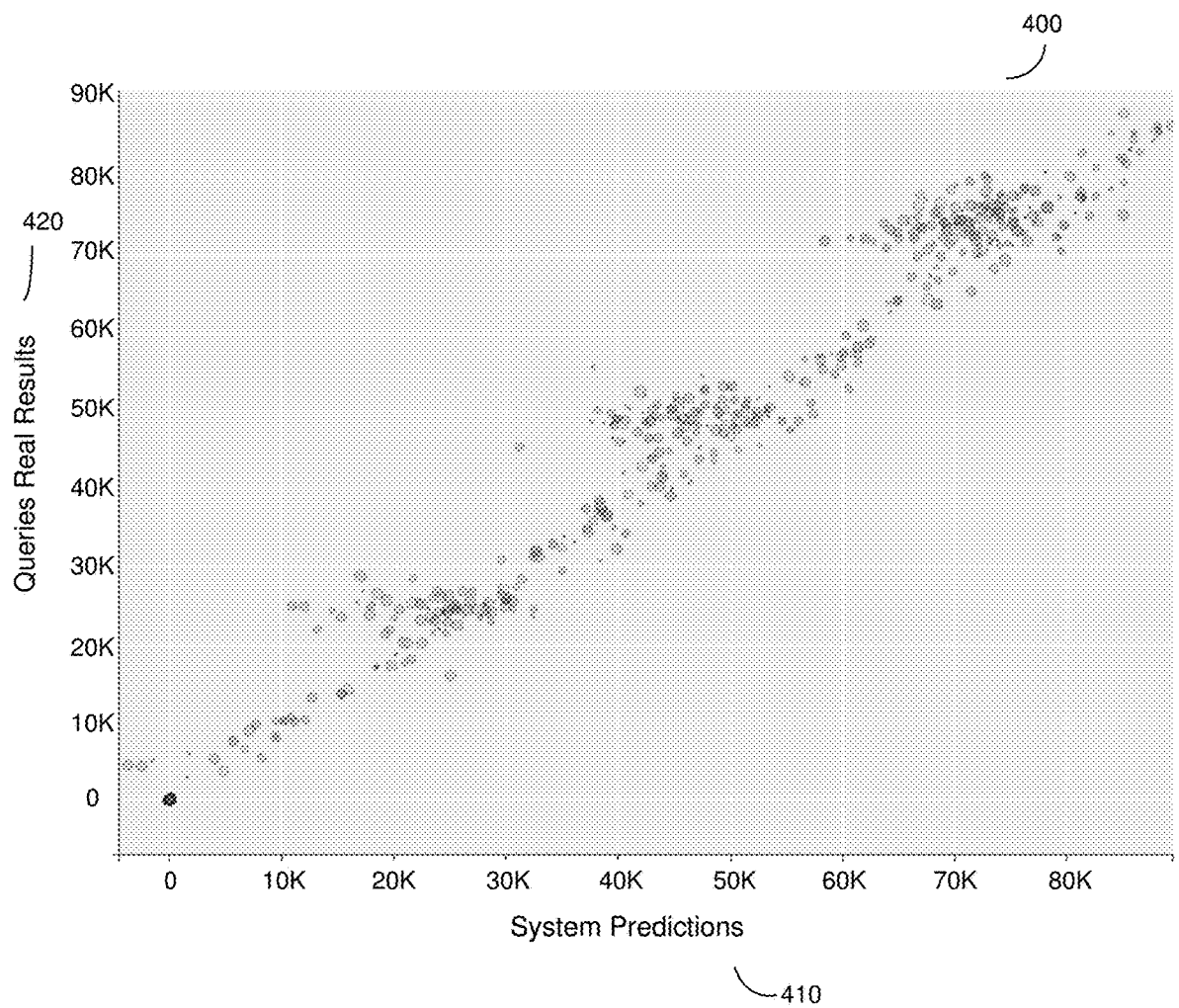
FIG. 4 is an example graph showing real query results plotted against predictions of a neural network.

FIG. 4 is an example graph 400 showing real query results 420 plotted against predicted results 410 generated a neural network. An ideal version of the graph should be linear, where the neural network would accurately predict a real result. As the neural network is trained, i.e., as batches of training query pairs are processed by the neural network, the graph should converge toward a linear function.

Figure 5:
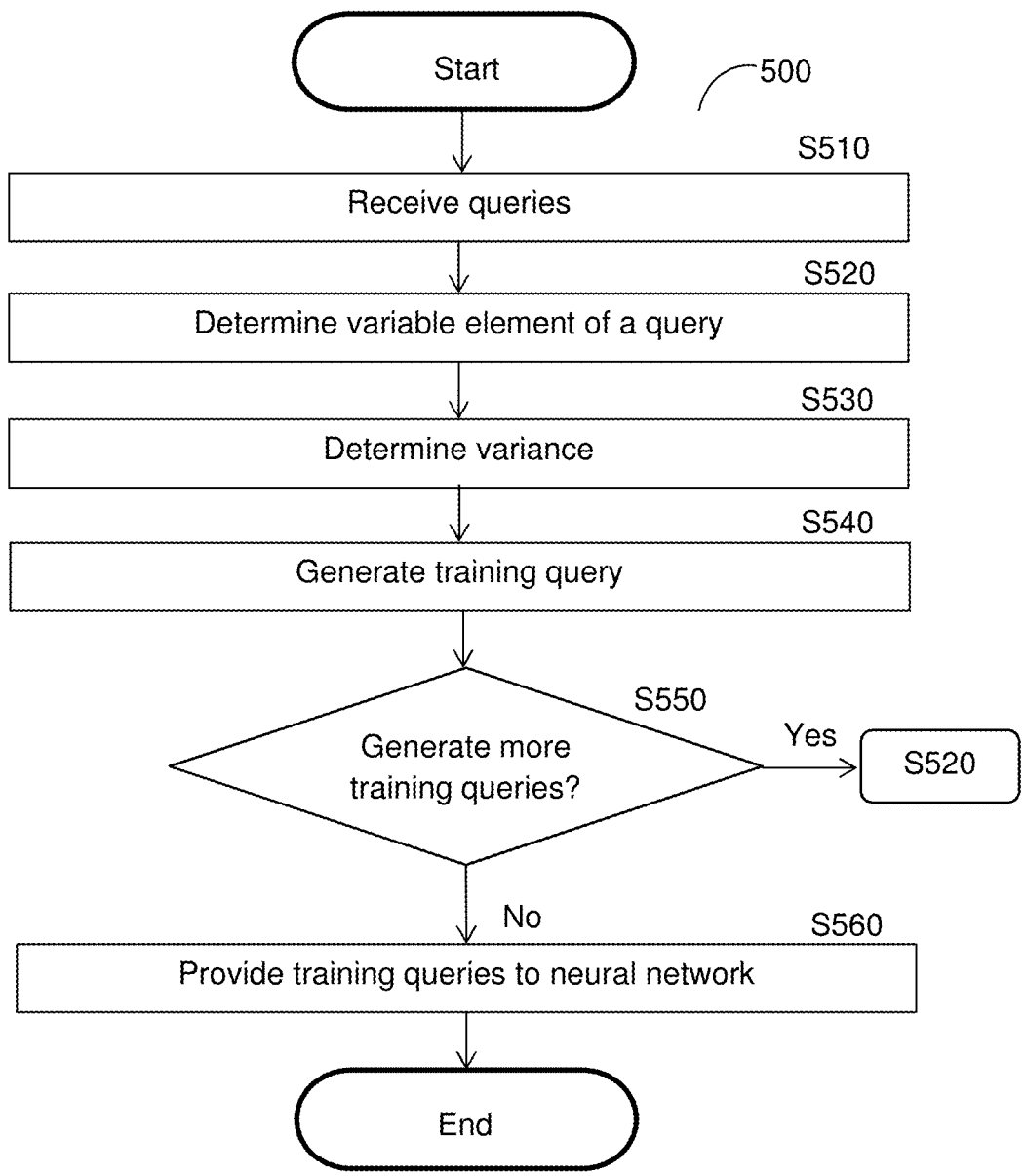
FIG. 5 is a flowchart illustrating a method for generating a query training set for a neural network according to an embodiment.

FIG. 5 is a flowchart 500 illustrating a method for generating a query training set for a neural network according to an embodiment. In an embodiment, the method is performed by the training set generator 130, FIGS. 1A-B.

As noted above, the training of neural networks is required in order to provide sufficiently accurately results, where sufficiently accurate results are a percentage of predicted results matching the real results above a predetermine threshold. Training a neural network involves exposing the neural network to a plurality of training conditions and their previously calculated real results. This allows the neural network to adjust weight functions of the neurons within the neural network.

Typically, a large training set is required to achieve accurate results. However, training sets having both a sufficient depth of data (e.g., queries which require different areas of data for their results, take variance into account, and the like), and a sufficiently large quantity of query examples are not always available. Therefore, it may be advantageous to generate a qualified training set. An example method is discussed herein.

At S510, a set of queries is received. The set of queries may be queries that have been generated by one or more users, for example through user nodes. Typically, this set of queries does not include enough queries to train a neural network to a point where the predictions are sufficiently accurate (e.g., accurate above a threshold).

At S520, a variable element of a first query of the set of queries is determined. As a non-limiting example, a query may be the following:

select sum(Income) from data where sales between 18 and 79 where the variable 'sales' has a value between 18 and 79.

At S530, a variance of the variable element is determined. The determined variance includes a subset of the determined variable element. Following the above example where the variable 'sales' has a value between 18 and 79, the real full data set may have values ranging between 0 and 1,000. Thus, querying for the sum of income values between 18 and 79 may not be representative of the sum of income for the entire data set, which would bias the NN model. In order to avoid this, the variance of the training queries is determined to take into account this potential bias.

At S540, a training query is generated based on the determined variable element and the variance thereof. In the above example, the following query will be generated:

select sum(Income) from data where sales between 24 and 82 or, as another example:

select average(Income) from data where sales between 312 and 735

In the above examples, the training set generator determines a predicate. A predicate is a term for an expression which is used to determine if the query will return true or false, e.g., the result the query is requesting, and generates the training query based on the predicate, the variable, and the variance of the query.

At S550, it is determined whether additional training queries should be generated and, if so, execution continues at S520; otherwise execution continues at S560. The determination may be based on, for example, whether a total number of queries (real and predicted) has exceeded a predetermined threshold, whether the total number of predicted queries is above a threshold, and the like. For example, it may be determined if the training queries are equal to a representative sample of the data set (i.e., queries that are directed to all portions of the data, or to a number of portions of the data above a predetermined threshold). In another example, it may be determined if additional variance is required for certain predicates.

At S560, the training queries are provided to the input layer of the neural networks for training. Typically, the training queries are executed on the data set in order to generate a query pair which includes the query and a real result thereof. The training queries and real results are then vectorized to a matrix representation which the neural network is fed (as described in more detail above with respect to FIG. 3).

Figure 6:
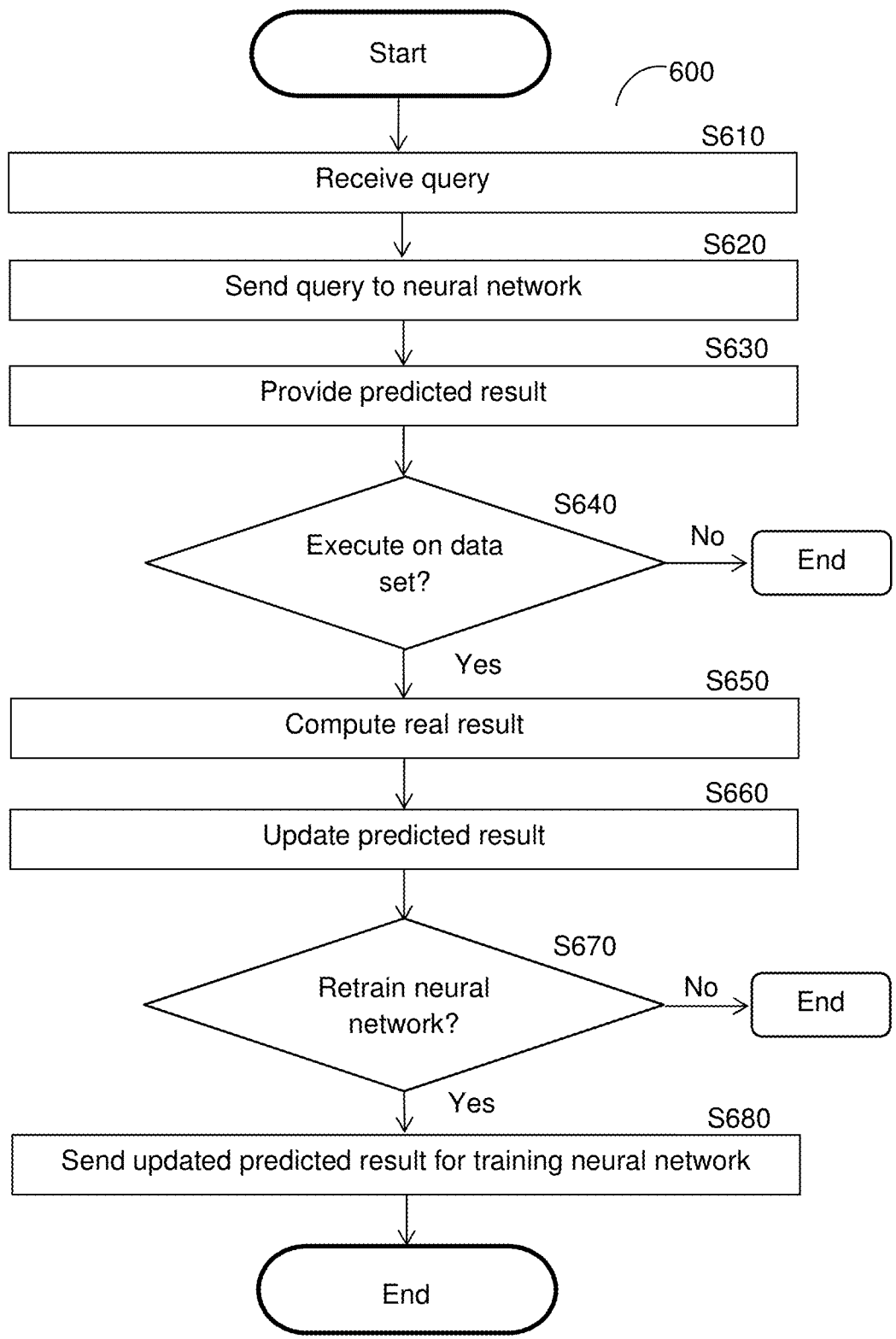
FIG. 6 is a flowchart illustrating a method for generating approximate query results for a neural network according to an embodiment.

FIG. 6 is a flowchart illustrating a method 600 for generating approximate query results for a neural network according to an embodiment. In an embodiment, the method may be performed by the approximation server 150 of FIGS. 1A-B. The approximate query results may be utilized as, for example, predicted results as described herein.

At S610, a query is received for execution on a data set. The query may be received from a user node, e.g., the user node 140 of FIG. 1.

At S620, the received query is sent to a trained neural network. In an embodiment, S620 includes determining whether the neural network is trained to provide a sufficiently accurate response to the received query. This may be based on, for example but not limited to, a version number of the neural network indicating the training level thereof.

At S630, a predicted result is provided. The predicted result is received from the neural network based on the sent query. In an example implementation, the predicted result may be sent to a user node from which the query was received.

At S640, it is determined whether the query should be executed on the data set in order to provide a real result in addition to the predicted result. In some embodiments, it may be advantageous to first supply a predicted answer immediately as the query is received, while additionally computing the real result of the query on the data set. This determination may be based on, for example, the version number of the neural network, the resources available to run the query through the neural network, the time required to execute the query, and so on. If a real result is determined to be provided, execution continues at S650; otherwise execution terminates.

At S650, when it is determined that the query should be executed on the data set, a real result is computed by executing the query on the data set. In an embodiment, the query may be executed while the predicted result is being provided. Execution may include sending all or part of the query to a DBMS of a database for execution thereon.

At S660, an updated predicted result is provided based on the real result. The updated predicted result is provided to the same entity that received the original predicted result at S630. In an embodiment, a notification may be provided to indicate that the result has been updated from an approximate and predicted result to real result. The notification may be a textual notification, a visual notification (such as the text or background of the notification changing colors), and the like.

At S670, it is determined whether the neural network should be trained further and, if so, execution continues at S680; otherwise, execution terminates. For example, if the difference between the real result and the predicted result is below a threshold, it may be determined not to train the neural network, as the results are sufficiently accurate. Alternatively, it may be determined that the same result should be used for training, even if below a threshold, in order to reinforce the quality of the prediction.

At S680, the query and real result are sent to the neural network as inputs to the input layer of the neural network in order to further train the neural network. The neural network may be trained based on its latest state, i.e., its latest version number. The version number may be updated every time the neural network is trained based on the real result and the predicted result.

In an example embodiment, an approximation server of the neural network receives queries and their real results, e.g., a real result computed for a query as per S650, and stores them for periodic training of the neural network. In another example embodiment, the query and result may be used by a training set generator to generate another set of training queries. In certain embodiments where the neural network further includes a version number, the version number may be updated each time the neural network is retrained. A copy with a version number of the neural network may be stored on any of the devices discussed with respect to FIGS. 1A and 1B above.

In an embodiment, the received query may be provided to a plurality of neural networks to be executed on each of their models, e.g., at S620, where at least two NN of the plurality of NNs differ from each other in the number of layers, the number of neurons, or both. For example, a first neural network will receive the query and generate a first predicted result. The first predicted result may be sent to a user node, sent to a dashboard, report, and the like. In parallel, or subsequently, the query is sent to a second neural network that has more layers, neurons, or both, than the first neural network.

Upon receiving a second predicted result from the second neural network, the result available to the user node may be updated based on the second predicted result, e.g., at S660. In certain embodiments, a loss function may be determined and a result thereof generated, for example by an approximation server. A loss function may be, for example, a root mean squared error. The loss function may be used to determine a confidence level of the prediction of a neural network. In an embodiment, the query may be provided to the "leanest" neural network (i.e., the neural network with the fewest number of layers, neurons, or both), which would require less computational resources.

A confidence level may be determined for the prediction, and if it falls below a threshold (i.e., the confidence level is too low) then the query may be provided to the next neural network, which would require more computational resources than the first NN, but may require less computational resources than a third NN or than executing the query on the data set itself to generate real results.

Figure 7:
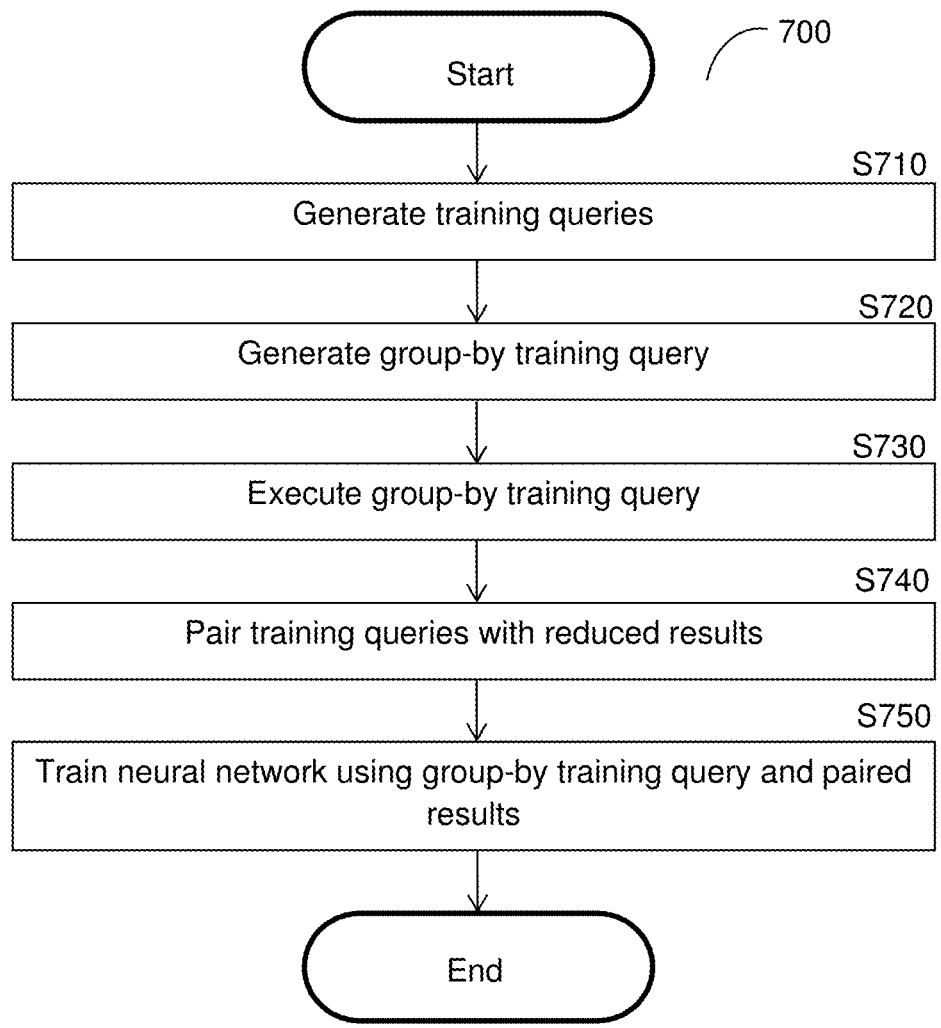
FIG. 7 is a flowchart illustrating a method for generating a training set for training a neural network to approximate query results according to an embodiment.

FIG. 7 is a flowchart 700 illustrating a method for generating a training set for training a neural network to approximate query results according to an embodiment. In an embodiment, the method is performed by the training set generator 130, FIGS. 1A-B.

At S710, a plurality of training queries are generated. In an embodiment, the training queries are generated as discussed in more detail above with respect to FIG. 5.

At S720, a group-by query is generated based on a subset of the plurality of training queries. The subset of training queries includes queries which are directed to one or more columns with a shared key, by which results of the query may be grouped. By executing a group-by query, rather than executing each query individually, memory and computational resources are reduced, allowing for either generating a larger dataset or minimizing the time required to generate a dataset of given size.

At S730, the group-by query is executed on a dataset. The dataset in this example is a table of a columnar database. The following table may illustrate this:

TABLE 1

| Index | Month    | Name     | Salary  |
|-------|----------|----------|---------|
| 1     | January  | Daniel   | 10,000  |
| 2     | January  | Jonathan | 8,000   |
| 3     | January  | Tom      | 8,000   |
| 4     | February | Daniel   | 12,000  |
| 5     | February | Jonathan | 9,500   |
| 6     | February | Tom      | 9,500   |

The table in this simplified example provides, in each row, an employee name and their salary for a given month. The training queries may include the following queries:
select sum(Salary) from Table where Name=Daniel
select sum(Salary) from Table where Name=Jonathan
Rather than execute these as individual queries, the system may identify such queries and generate from them a group-by query:
select Name, sum(Salary) from Table group by Name
to produce the following result:

TABLE 2

| Name     | Sum (Salary) |
|----------|--------------|
| Daniel   | 22,000       |
| Jonathan | 17,500       |
| Tom      | 17,500       |

At S740, the result of the group-by query is reduced, such that each row is paired with the corresponding training query. For example, the training query
select sum(Salary) from Table where Name=Daniel
is paired with the value 22,000 from Table 2 which corresponds to the where clause of where Name=Daniel. Thus, the training set is generated with query pairs of queries and corresponding results, thereby reducing the computational and memory overhead of executing a plurality of queries individually.

At S750, a neural network is trained using a plurality of training queries and corresponding results. The training queries include the group-by training query and the corresponding results for the group-by training query include the paired results for the group-by training query.

Figure 8:
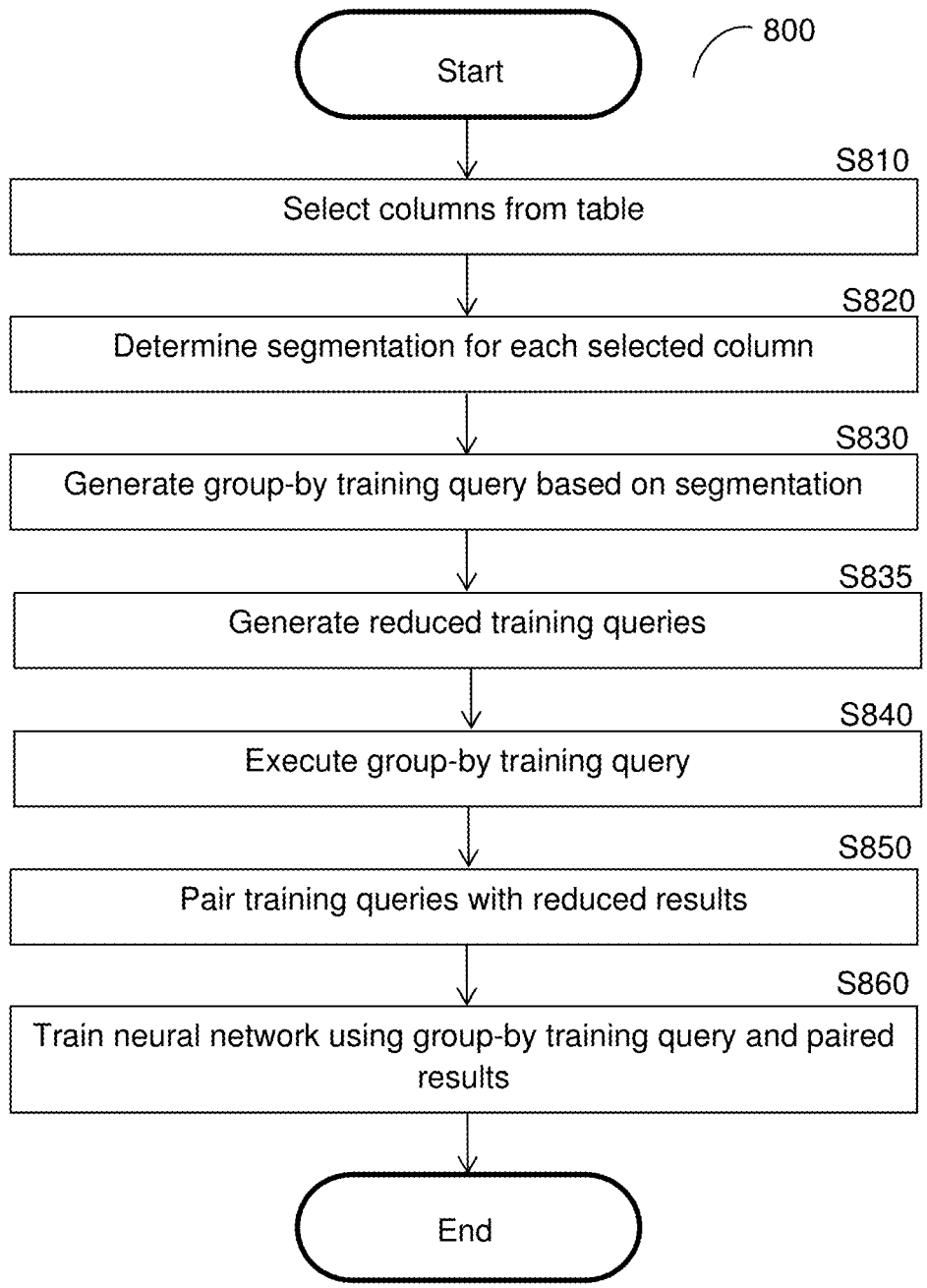
FIG. 8 is a flowchart illustrating a method for generating a training set for training a neural network to approximate query results according to another embodiment.

FIG. 8 is a flowchart 800 illustrating a method for generating a training set for training a neural network to approximate query results according to another embodiment. In an embodiment, the method is performed by the training set generator 130, FIGS. 1A-B.

At S810, one or more columns are selected from a table. In an embodiment, the columns are segmented into dimensions or measures. In some embodiments, the dimension(s) may be determined for a dataset, which can include a plurality of tables.

A dimension is a data element of a dataset which may be used for filtering, labelling or grouping the data stored in a table. In the above example of FIG. 7, the non-limiting example dimensions include 'Name' and 'Month'. A measure is a column containing numeric data which can be aggregated. In some embodiments, the measure may have a range of values. However, not every range of values is a measure. For example, numbers one through twelve may be used to represent months of the year such that a column structured using months would have a dimension of 12, rather than be defined as having measures with an upper bound of 12 and lower bound of 1.

At optional S820, segmentation may be determined for each measure of the table (or dataset). In another embodiment, segmentation may be derived from the possible data elements that a dimension can receive. For example, the dimension 'Name' may be segmented into Daniel, Jonathan, and Tom. In another example, determining segmentation of a measure may include determining an upper and lower bound for a numerical value, such as the 'Salary' dimension in the above example, which has a lower bound of 8,000 and an upper bound of 12,000. For numerical values, range segmentations may be generated, e.g. between 8,000 and 10,000 and between 10,001 and 12,000. In other example implementations, the ranges may overlap. Determining segmentation of a measure may also include determining a distribution of values.

At S830, a group-by training query is generated for execution on the dataset based on one or more of the determined segmentations. For example, a group-by query may be generated based on a dimension, or in another embodiment, a plurality of measures or ranges of measures. In some embodiments, a plurality of group-by training queries may be generated, each based on at least a dimension and corresponding segmentation. In certain embodiments, the group-by query may be nested with one or more group-by queries.

At S835, a plurality of reduced training queries is generated based on the group-by training query. For example, the reduced training query may include a 'WHERE' clause, which specifies the query for a specific value of the dimension.

At S840, the group-by training query is executed on the dataset, and a result table is received. The result table of a group-by query is typically a table such as Table 2 discussed herein above.

At S850, the result table is reduced, and each reduced result is paired with a reduced training query of the plurality of reduced training queries.

At S860, a neural network is trained based on the reduced training queries and the paired reduced results.

Figure 9:
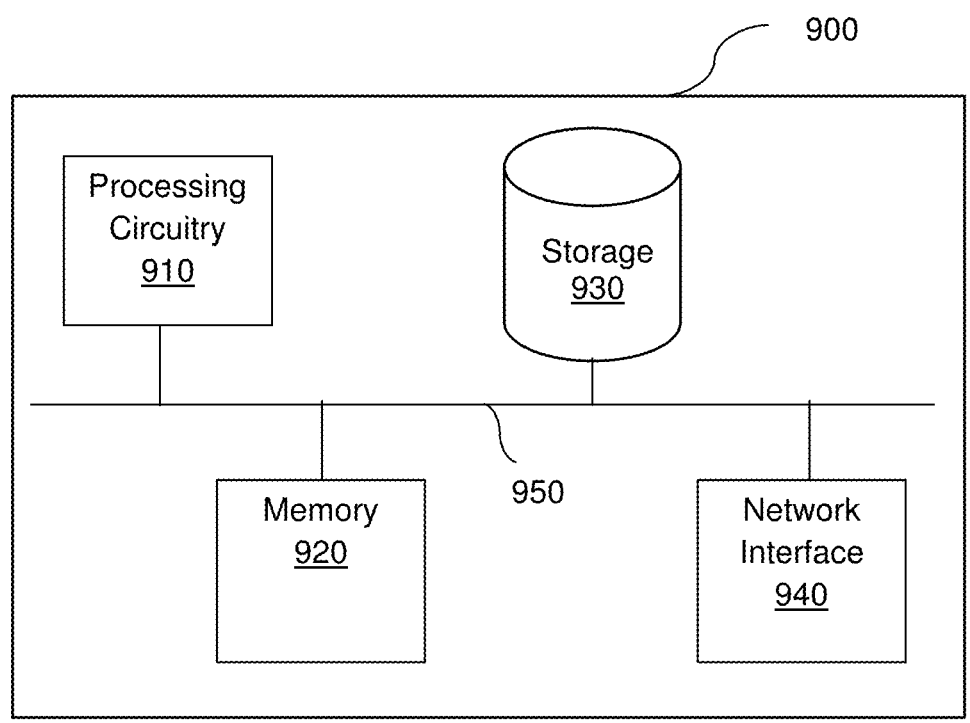
FIG. 9 is an example schematic diagram of a system 900 according to an embodiment.

FIG. 9 is an example schematic diagram of a system 900 according to an embodiment.

The system 900 may be configured as the training set generator 130 or the approximation server 150, FIG. 1.

The system 900 includes a processing circuitry 910 coupled to a memory 920, a storage 930, and a network interface 940. In an embodiment, the components of the system 900 may be communicatively connected via a bus 950.

The processing circuitry 910 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 920 may be volatile (e.g., RAM, etc.), non-volatile (e.g., ROM, flash memory, etc.), or a combination thereof.

In one configuration, software for implementing one or more embodiments disclosed herein may be stored in the storage 930. In another configuration, the memory 920 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 910, cause the processing circuitry 910 to perform the various processes described herein.

The storage 930 may be magnetic storage, optical storage, and the like, and may be realized, for example, as flash memory or other memory technology, CD-ROM, Digital Versatile Disks (DVDs), or any other medium which can be used to store the desired information.

The network interface 940 allows the system 900 to communicate, for example via the network 110.

It should be understood that the embodiments described herein are not limited to the specific architecture illustrated in FIG. 9, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for generating training sets for training neural networks, comprising:
   determining a segmentation based on a column from a columnar database table;
   generating a group-by query based on the segmentation;
   generating a plurality of reduced queries based on the group-by query;
   executing the group-by query on a table of a database to obtain a result table, wherein the result table includes a plurality of results, wherein each result corresponds to a respective reduced query of the plurality of reduced queries; and
   generating a plurality of training query pairs by pairing each reduced query with its corresponding reduced result.

2. The method of claim 1, wherein the segmentation is based on dimensions.

3. The method of claim 1, wherein the segmentation is based on measures.

4. The method of claim 3, further comprising:
   determining a distribution of values pertaining to the measures, wherein the segmentation is determined based on the distribution of values.

5. The method of claim 1, wherein generating the group-by query further comprises:

generating at least one nested query within the group-by query.

6. The method of claim 1, further comprising:
generating a plurality of training queries based on a set of queries generated by at least one user.

7. The method of claim 6, wherein generating each training query further comprises:
determining a variable element of a query of the set of queries; and
determining a variance of the variable element, wherein the training query is generated based on the determined variable element and the determined variance.

8. The method of claim 1, further comprising:
training a neural network at least partially using the plurality of training query pairs.

9. The method of claim 8, wherein the neural network is further trained when a predicted result generated by the neural network differs from a real result generated based on a dataset above a threshold, further comprising:
generating an updated predicted result based on the predicted result and the real result, wherein the updated predicted result is utilized as a training input to the neural network.

10. A non-transitory computer readable medium having stored thereon instructions for causing a processing circuitry to execute a process, the process comprising:
determining a segmentation based on a column from a columnar database table;
generating a group-by query based on the segmentation;
generating a plurality of reduced queries based on the group-by query;
executing the group-by query on a table of a database to obtain a result table, wherein the result table includes a plurality of results, wherein each result corresponds to a respective reduced query of the plurality of reduced queries; and
generating a plurality of training query pairs by pairing each reduced query with its corresponding reduced result.

11. A system for generating training sets for training neural networks, comprising:
a processing circuitry; and
a memory, the memory containing instructions that, when executed by the processing circuitry, configure the system to:
determine a segmentation based on a column from a columnar database table;
generate a group-by query based on the segmentation;
generate a plurality of reduced queries based on the group-by query;
execute the group-by query on a table of a database to obtain a result table, wherein the result table includes a plurality of results, wherein each result corresponds to a respective reduced query of the plurality of reduced queries; and
generate a plurality of training query pairs by pairing each reduced query with its corresponding reduced result.

12. The system of claim 11, wherein the segmentation is based on dimensions.

13. The system of claim 11, wherein the segmentation is based on measures.

14. The system of claim 11, wherein the system is further configured to:
determine a distribution of values pertaining to the measures, wherein the segmentation is determined based on the distribution of values.

15. The system of claim 11, wherein the system is further configured to:
generate at least one nested query within the group-by query.

16. The system of claim 11, wherein the system is further configured to:
generate a plurality of training queries based on a set of queries generated by at least one user.

17. The system of claim 16, wherein the system is further configured to:
determine a variable element of a query of the set of queries; and
determine a variance of the variable element, wherein the training query is generated based on the determined variable element and the determined variance.

18. The system of claim 11, wherein the system is further configured to:
train a neural network at least partially using the plurality of training query pairs.

19. The system of claim 18, wherein the neural network is further trained when a predicted result generated by the neural network differs from a real result generated based on a dataset above a threshold, wherein the system is further configured to:
generate an updated predicted result based on the predicted result and the real result, wherein the updated predicted result is utilized as a training input to the neural network.

* * * * *